(12) United States Patent
Tuilier

(10) Patent No.: US 7,020,489 B2
(45) Date of Patent: Mar. 28, 2006

(54) CONTACT-FREE ELECTRONIC LABEL FOR MOBILE TELEPHONE

(75) Inventor: Edmond Tuilier, Marseilles (FR)

(73) Assignee: Gemplus, Gemenos (FR)

( * ) Notice: Subject to any disclaimer, the term of this patent is extended or adjusted under 35 U.S.C. 154(b) by 344 days.

(21) Appl. No.: 10/380,945

(22) PCT Filed: Sep. 11, 2001

(86) PCT No.: PCT/FR01/02812

§ 371 (c)(1),
(2), (4) Date: Mar. 20, 2003

(87) PCT Pub. No.: WO02/25580

PCT Pub. Date: Mar. 28, 2002

(65) Prior Publication Data

US 2003/0189095 A1    Oct. 9, 2003

(30) Foreign Application Priority Data

Sep. 21, 2000    (FR) .................................. 00 12039

(51) Int. Cl.
*H04B 1/38*    (2006.01)
(52) U.S. Cl. ..................... 455/558; 455/557; 455/575.1
(58) Field of Classification Search ............... 455/41.1, 455/41.2, 407, 411, 419, 551, 558, 575.1; 340/572.1, 572.4, 572.8
See application file for complete search history.

(56) References Cited

U.S. PATENT DOCUMENTS

| 6,008,727 | A | | 12/1999 | Want et al. |
| 6,097,967 | A | * | 8/2000 | Hubbe et al. ............... 455/558 |
| 6,412,693 | B1 | * | 7/2002 | Kalinowski ................. 235/383 |
| 6,597,917 | B1 | * | 7/2003 | Meuronen .................... 455/466 |
| 6,859,650 | B1 | * | 2/2005 | Ritter ......................... 455/406 |
| 6,892,067 | B1 | * | 5/2005 | Sharma et al. .............. 455/419 |

FOREIGN PATENT DOCUMENTS

FR    2776407 A    9/1999

OTHER PUBLICATIONS

Peyrucat, Jean-Francois, "*Etiquettes Electroniques: Quand Les Produits Se Fichent D'eux Memes . . .* "; No. 602, Feb. 27, 1989, pps. 37-42, XP000050718, ISSN: 0755-219X.

* cited by examiner

*Primary Examiner*—Bing Q. Bui
(74) *Attorney, Agent, or Firm*—Buchanan Ingersoll PC

(57) ABSTRACT

Contact-free electronic labels for mobile telephones that can be, for example, associated with a support associated with each mobile telephone card. The electronic labels include a memory and controller for recording and reading, wholly or partly, data identifying the card and its characteristics, as well as data concerning different steps of the card distribution. The invention is applicable to silicon chip cards designed to be inserted in a mobile telephone handset.

26 Claims, 2 Drawing Sheets

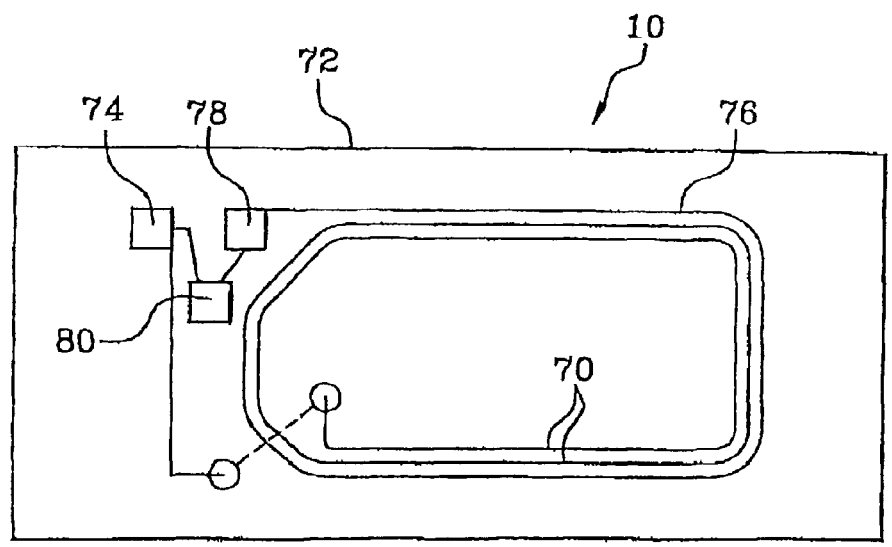
Fig. 2
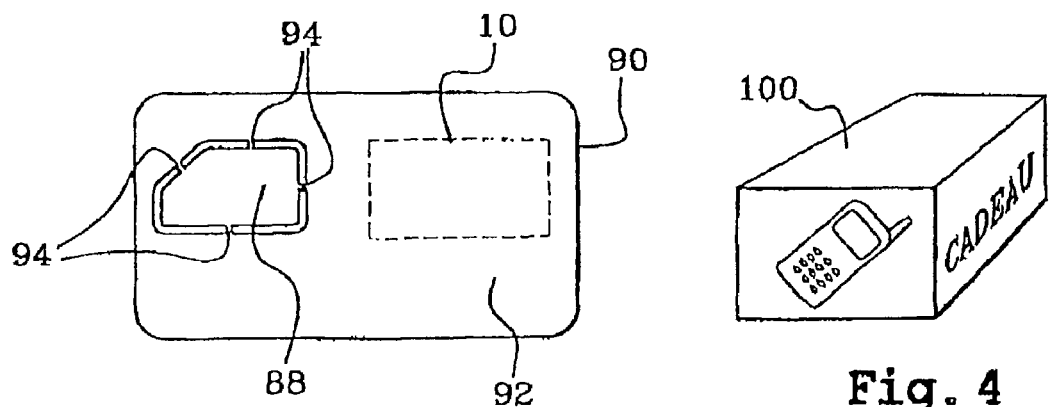
Fig. 3
Fig. 4
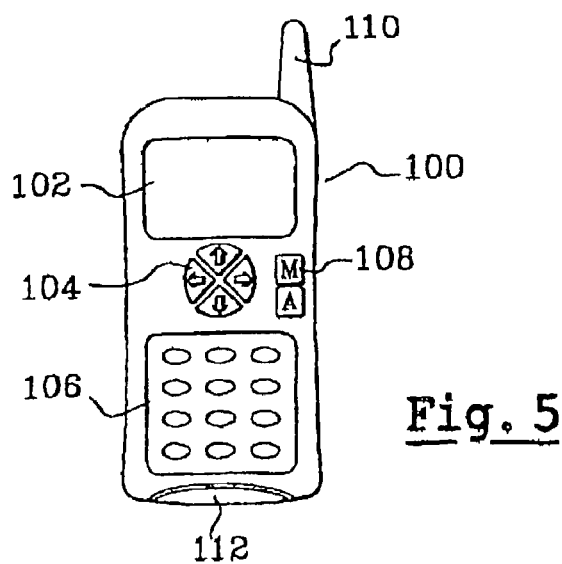
Fig. 5

CONTACT-FREE ELECTRONIC LABEL FOR MOBILE TELEPHONE

This disclosure is based upon French Application No. 00/12039, filed on Sep. 21, 2000 and International Application No. PCT/FR01/02812, filed Sep. 11, 2001, the contents of which are incorporated herein by reference.

BACKGROUND OF THE INVENTION

The invention relates to the electronic labels which are used for identifying the objects with which they are associated.

The use is known of bar codes for identifying objects, such as grocery items, by printing them directly on the wrapping or by means of labels which are then stuck on the wrapping. These bar codes are for example read by an optical reading device at the shop cash desk and the bar code read is used, by means of a computer system, to display its price on a screen and to add it to the prices of the other items previously passed through at the cash desk.

These bar codes have the major drawback of being fixed, that is to say they cannot be updated during the life of the object except by creating a new bar code which replaces the old one, this new bar code reproducing all or part of the old bar code but adding thereto other information which is necessary or simply useful for the remainder of the distribution operations.

As a result, several bar codes are affixed to each item in the course of the distribution chain, which gives rise to many handling operations and is therefore a source of errors. It is therefore difficult and expensive to monitor the item during its life using bar codes which are different from one distribution step to another.

This problem is particularly acute in the distribution of mobile telephones where each handset can be associated with an electronic smart card, called a SIM card, which contains all the elements allowing use of the handset by a new subscriber according to certain usage rights defined in the subscription. It should be noted that "SIM" is the acronym for the expression "Subscriber Identification Module".

This is because the SIM cards and the handsets are manufactured and distributed separately from one another, and are listed under different codes or numbers.

Thus, the SIM card is identified in an EF-ICC file recorded in the memory of the card, "EF-ICC" being the acronym for the expression "Entry File—Integrated Circuit Chip", which contains the following information:
  the serial number of the manufacturer;
  the serial number of the card for the telephone operator, indicating its description, its series and its number in the series;
  the international number of the subscriber, known by the acronym "IMSI" for the expression "International Mobile Subscriber Identity";
  authentication keys, known by the acronym "KI" for the expression "Key Information", are associated with this IMSI number;
  finally, for each mobile telephone operator, the IMSI numbers are grouped in databases known by the acronym "HLR" for the expression "Home Location Register", each being identified by a number.

Furthermore, each handset contains an identification serial number better known by the acronym "IMEI" for the expression "International Mobile Equipment Identity".

When a SIM card is sold with a handset to a subscriber, a call number is assigned to the latter and is known by the acronym "MS-ISDN" for the expression "Mobile Station—Integrated Services Digital Number".

The telephone operator, who receives the SIM cards and the handsets, distributes them by means of various distribution chains which each comprise a distributor, wholesalers and retailers. At each distribution step, it is necessary to list and itemise the SIM cards and handsets while adding thereto other information relating to the actions performed, in particular the identity of the one taking the action. Hence the replacement of the bar codes with others at each step with an inferior result as regards monitoring of the distributed items, SIM cards and telephone handsets.

Moreover, the bar codes must be visible from outside the wrapping, which does not allow direct use of the bar code associated with the SIM card, which is inside the wrapping, except by making therein a window for reading.

There is therefore, at least in this mobile telephone distribution field, a great need for simplification of the product monitoring operations in order to reduce the cost thereof and the number of errors while improving their traceability.

SUMMARY OF THE INVENTION

One aim of the present invention is to make it possible to monitor the different steps in the distribution of a SIM smart card and/or a telephone handset for a mobile telephone simply, economically and without error.

This aim is achieved by associating a contactless electronic label with the SIM smart card and/or the telephone handset and in which there is recorded respectively all or part of the information identifying the SIM card and/or the telephone handset as well as information relating to the different steps in the mobile telephone distribution chain.

The invention therefore relates to a contactless electronic label for a telephone handset and/or a smart card intended to be connected electrically to said telephone handset in order to constitute a mobile telephone apparatus, characterised in that said electronic label is associated with at least one of the two elements making up the mobile telephone apparatus and comprises means for recording and reading, at least, information identifying the element with which it is associated.

This electronic label can also comprise means for recording and reading information relating to the different distribution steps for the element with which it is associated.

The information identifying the SIM smart card comprises, for example, one or more of the following numbers or codes:
  the serial number of the manufacturer of the SIM smart card;
  the serial number of the smart card;
  the international number of the subscriber known by the acronym "IMSI" for the expression "International Mobile Subscriber Identity";
  the "HLR" number identifying the database in which the "IMSI" number of the subscriber is listed, "HLR" corresponding to the expression "Home Location Register".

This information identifying the SIM smart card corresponds to that contained in a file in a memory of the SIM smart card. This file is known by the acronym EF-ICC for the expression "Entry File—Integrated Circuit Chip".

The information identifying the telephone handset comprises, for example, the serial number identifying the handset. This number corresponds, wholly or partially, to that contained in a file in a memory of the handset.

The information relating to the different distribution steps comprises one or more of the following numbers or codes:
- the codes identifying the different participants at each distribution step;
- the codes identifying the states of the transfers between the different participants;
- the call number assigned to the subscriber, known by the acronym "MS-ISDN".

When a SIM smart card is associated with a telephone handset, the code or number identifying the latter is recorded in the electronic label associated with the SIM smart card.

Similarly, when a telephone handset is associated with a SIM smart card, the code or number identifying the latter is recorded in the electronic label associated with the telephone handset.

The invention also relates to a SIM electronic smart card with which a contactless electronic label as defined above is associated.

It also relates to a telephone handset with which a contactless electronic label as defined above is associated.

Finally, the invention relates to packaging for a mobile telephone apparatus which comprises, at least, a contactless electronic label as defined above.

BRIEF DESCRIPTION OF THE DRAWINGS

The invention will be better understood from a reading of the following description of a particular embodiment, said description being given in relation to the accompanying drawings in which:

FIG. 2 is a view showing a contactless electronic label;

FIG. 3 is a view showing an electronic label associated with a SIM smart card support;

FIG. 4 is a view of a parcel containing a SIM smart card and a telephone handset which are provided for sale to the subscriber; and FIG. 5 is a view showing a telephone handset into which the SIM smart card is inserted in order to implement the subscription to a mobile telephone network.

DETAILED DESCRIPTION

Figure 1:
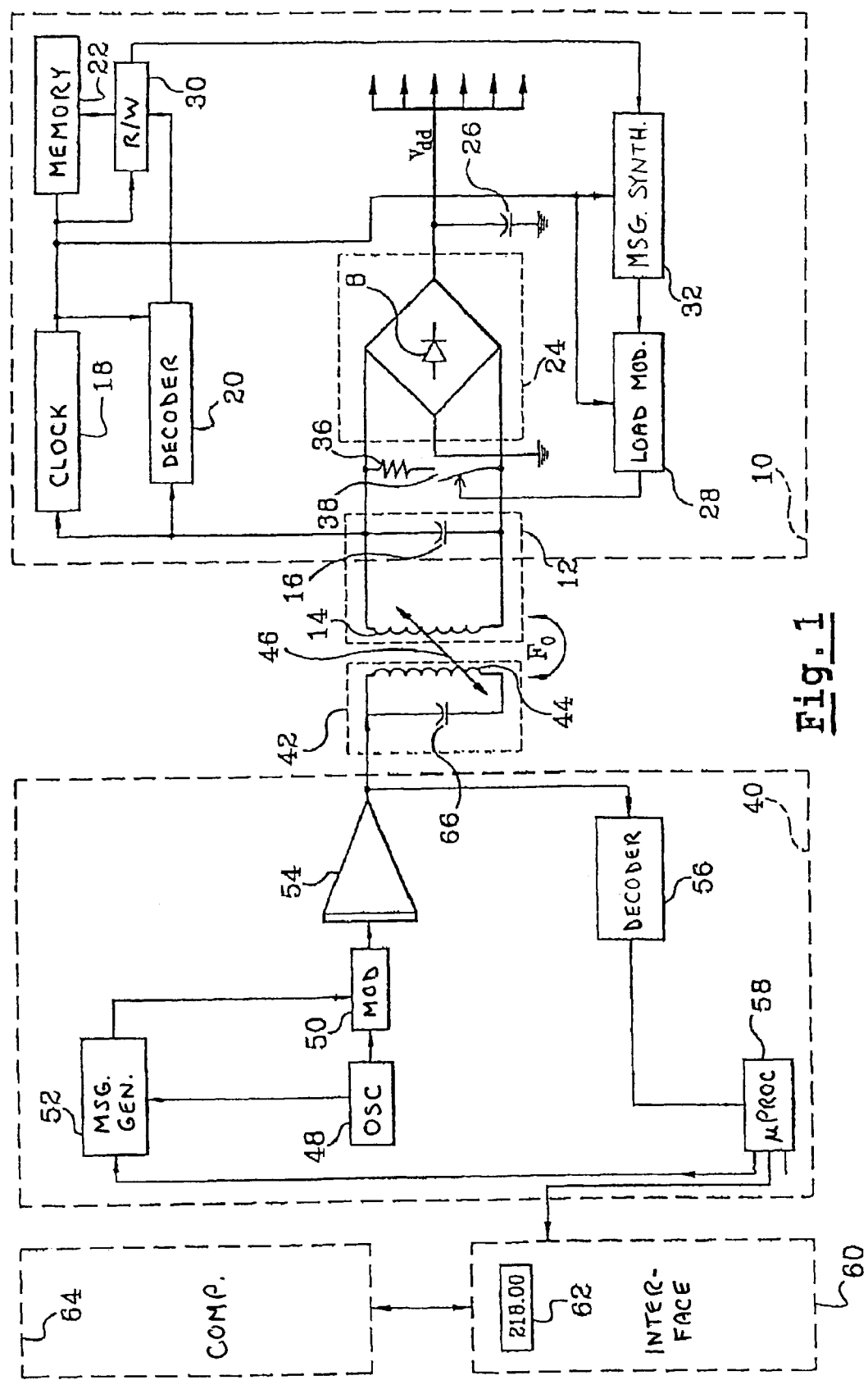
FIG. 1 is a functional diagram of a contactless electronic label associated with an interrogation/reading/writing device.

A contactless electronic label 10 comprises, for example (FIG. 1), an antenna 12 consisting of a tuned circuit which comprises an induction winding 14 and a capacitor 16. The tuned frequency $F_0$ of the antenna 12 is for example 13.56 Megahertz.

This tuned circuit of the antenna is connected to different circuits which each implement a particular function. Thus, a circuit 24 implements the function of full-wave rectification of the signal with frequency $F_0$ at the terminals of the tuned circuit, for example, by a diode bridge 8. This rectification circuit 24 is followed by a capacitor 26 for filtering the rectified signal which provides the supply voltage $V_{dd}$ for all the other circuits of the electronic label, in particular those depicted in FIG. 1.

A circuit 18 implements the so-called Clock function and the synchronisation thereof from the frequency $F_0$. The signals at different frequencies provided by this Clock circuit 18 are applied to the other circuits of the label except the antenna 12 and the rectification circuit 24.

The circuit 20 implements the function of demodulation and decoding of the low frequency signals which modulate the signal at the carrier frequency $F_0$, signals which constitute the information received by the label.

The information relating to the product with which the label is associated is recorded in a memory 22 which is addressable by a record/read circuit 30.

This record/read circuit 30 is under the control of the signals detected and decoded by the circuit 20 and provides signals which are applied to a message synthesis circuit 32.

The messages provided by the synthesis circuit 32 are applied to an antenna load modulation circuit which has been depicted schematically by a circuit 28 and a switch 38 controlled by the circuit 28. A load resistor 36 has been depicted in series with the switch 38.

The device 40 for interrogation/reading/writing of the label 10 comprises for example in a known manner an antenna 42 consisting of a tuned circuit which comprises an induction winding 44 and a capacitor 66, the tuned frequency being $F_0$. The two antennas 12 and 42 are magnetically coupled as represented by the arrow 46.

The antenna 42 is supplied by electrical signals at the carrier frequency $F_0$ which are modulated by low frequency digital signals conveying the information to be transmitted to the label 10. These modulated electrical signals are produced by a modulator 50 which receives, on the one hand, a signal at the frequency $F_0$ from an oscillator 48 and the modulation signals from a message generator 52. The output signals of the modulator 50 are applied to a power amplifier 54, the output terminal of which is directly connected to the antenna 42.

The signals received by the antenna 42 are applied to a receiving circuit 56 which implements the detection, demodulation and decoding thereof. The decoded signals are applied to a microprocessor 58 which interprets them and provides the control signals for the message generator 52.

Where the decoded signals correspond to a code identifying the product type, this identification code is transmitted to an accounting device 60 or interface identical to those used in the "bar" code systems and which is connected to a computing device 64 providing the prices of the items. This interface 60 displays on a screen 62 the price of each product which is passed in front of the interrogation/reading/writing device and adds up the prices corresponding to the different products. The total price of the products is displayed on the screen 62 as the products are passed in front of the interrogation/reading/writing device.

The interface 60 transmits messages and/or provides electrical signals to the interrogation/reading/writing device 40 and more particularly to the microprocessor 58, in order to indicate thereto, in particular, that the price of the product has been accounted for and, consequently, that it can transmit to the electronic label of the product a message indicating for example that the product is free to leave the shop without being suspected of having been stolen.

This message will have the effect, in the electronic label, of updating, in the memory 22, a so-called "anti-theft" code so as to avoid the triggering of an alarm upon passage of the product through an output barrier equipped with a device for interrogating/reading electronic labels which is especially adapted to read the anti-theft code.

The electronic label 10 is in the form of a sheet 72 made of a flexible insulating material, for example polypropylene, one face of which supports a metallic conductive winding 76 of a few turns 70 which implements the coil 14 (FIG. 1). The ends of this winding 76, in the form of pads 74 and 78, are connected to the input/output terminals of an electronic integrated circuit 80 (FIG. 1) which contains, among other things, the tuning capacitor 16 of the antenna 12 (FIG. 1).

According to the invention, each SIM electronic smart card for a mobile telephone has associated with it a contactless electronic label of the type described in connection with FIGS. 1 and 2. This association can be implemented in different ways, either directly by fixing the electronic label on the support of the SIM smart card, or indirectly by fixing the electronic label on any packaging containing the mobile telephone electronic smart card, such as a box, envelope or pouch.

Where the mobile telephone SIM card 88 itself forms part of a card 90 of larger format, for example bank card format, and is detached therefrom by finger pressure which breaks bridges 94, the electronic label 10 can be fixed on the part 92 of the card 90 which surrounds that carrying the SIM card.

According to the invention, at least part of the EF-ICC file of the SIM card is recorded in the memory 22 of the electronic label, this part concerning in particular:

the serial number of the manufacturer;
the serial number of the card identifying its description, its series and its number in the series;
the "IMSI" international number of the subscriber defined above;
the "KI" authentication key or keys defined above;
the number identifying the associated "HLR" database for a group of subscribers defined above.

This information can represent fifteen to twenty bytes but, according to the invention, the capacity of the memory 22 is provided for recording other information relating to the SIM card distribution chain such as:

a code identifying the distributor;
a code identifying the wholesaler;
a code identifying the retailer;
codes identifying dates of transfer between the participants in the distribution chain.

At the moment when the SIM card is associated with a telephone handset, the "MS-ISDN" serial number (defined above) identifying the handset can be recorded in the memory 22.

This portable telephone handset 100 (FIG. 5) comprises a screen 102, a screen navigator 104, a keypad 106 and an On/Off key 108. It also comprises a send/receive antenna 110 for the radio-frequency link and connection terminals 112, in particular for connecting to a battery charger or a peripheral such as an earphone.

The SIM smart card is inserted into the telephone handset 100 by its rear face so as to connect it to the electronic circuits of the telephone handset.

These serial numbers and codes are recorded in the memory 22 of the electronic label at different manufacturing and distribution steps by means of the interrogation/reading/writing device.

Thus, the serial numbers of the manufacturer of the card and of the card itself are recorded at the end of the manufacturing step both in the EF-ICC file of the SIM card and in the memory 22 of the electronic label associated therewith.

The codes identifying the participants in the distribution and the states of the transfers between the participants and all other information relating to distribution are recorded at each distribution step by means of the interrogation/reading/writing device.

The serial number identifying the handset is recorded in the memory 22 at the moment when a SIM card is associated with a handset, in particular at the moment of creation of the wrapping parcel 100 (FIG. 4) or packaging containing the two elements: the SIM card on its support and the handset. As the contactless electronic label 10 remains fixed to the SIM card 88, this electronic label can continue to be interrogated, recorded on and read by the interrogation/reading/writing device through the parcel wrapping or packaging.

At the moment when the SIM card is connected to the telephone handset, the electronic label is removed from the support 90 of the SIM card 88 and, depending on its dimensions, is fixed to the SIM card or to the telephone handset. This makes it possible to store all the information relating to the SIM smart card/telephone handset combination on a single electronic label.

The invention has been described by associating an electronic label on the packaging of the mobile telephone SIM smart card but it applies equally to the use of a contactless electronic label associated with the telephone handset which initially contains the information relating to the handset, information which can be contained in a file in a memory of the telephone handset, a file similar to the EF-ICC file of the SIM card. The memory of this electronic label associated with the handset can be updated as the distribution chain proceeds, in particular with the information in the EF-ICC file read from the SIM smart card at the time of their association.

It is clear that an electronic label can be associated, on the one hand, with the support of the SIM smart card or with its packaging and, on the other hand, with the telephone handset or its packaging, each label containing the information which relates to the associated product. At the end of the distribution chain ending in the sale of a complete mobile telephone apparatus, the memories of the two electronic labels should contain the same information if, at the time of the sale to the end customer, information is transferred from one electronic label to the other and vice-versa.

These various recording operations are performed by means of the interrogation/reading/writing device described in relation to FIG. 1.

The call number assigned to the purchasing subscriber could also be recorded in the memory 22 in the case where it is desirable to store in the electronic label all the information of the chain and to keep this label for a certain time.

In the description which has just been given of the invention, it is important to note that the electronic label which is associated with the SIM smart card and/or the telephone handset comprises a memory in which there is recorded over time not only the information relating to the associated product but also the information relating to distribution of the product.

The information relating to the associated product is, furthermore, contained in a file in a memory of the product itself and it is therefore easy to transfer it into the memory of the electronic label. This information relating to the associated product can also be recorded simultaneously in the memory of the product and in the memory of the electronic label at the end of manufacture.

What is claimed is:

1. A contactless electronic label for a telephone handset and/or a smart card adapted to be connected electrically to said telephone handset in order to constitute a mobile telephone apparatus, wherein said electronic label is associated with at least one of the two elements making up the mobile telephone apparatus and has associated therewith means for recording and reading information in said label identifying the element with which it is associated and information relating to different distribution steps through which said element passes.

2. A contactless electronic label according to claim 1, wherein the information relating to the different distribution steps comprises codes identifying the different participants at each distribution step.

3. A contactless electronic label according to claim 2, wherein the information relating to the different distribution steps comprises, in addition, codes identifying the status of transfers between the different participants.

4. A contactless electronic label according to claim 2, wherein the information relating to the different steps of distribution of the smart card comprises, in addition, the serial number of the telephone handset with which the smart card is associated.

5. A contactless electronic label according to claim 2, wherein the information relating to the different steps of distribution of the telephone handset comprises, in addition, information identifying the smart card with which the telephone handset is associated.

6. A contactless electronic label according to claim 1, wherein the information relating to the different distribution steps comprises a call number of the subscriber, known by the acronym "MS-ISDN" for the expression "Mobile Station—Integrated Services Digital Number".

7. A contactless electronic label for a smart card that is adapted to be electrically connected to a telephone handset to constitute a mobile telephone apparatus, wherein the label is associated with the smart card, and has associated therewith means for recording and reading information identifying the smart card that comprises the serial number of the manufacturer of the smart card.

8. A contactless electronic label according to claim 7, wherein the information identifying the smart card comprises, in addition, the serial number of the smart card.

9. A contactless electronic label according to claim 7, wherein the information identifying the smart card comprises, in addition, an international number of the subscriber known by the acronym "IMSI" for the expression "International Mobile Subscriber Identity".

10. A contactless electronic label according to claim 9, wherein the information identifying the smart card comprises, in addition, an "HLR" number identifying a database in which the "IMSI" number of the subscriber is listed, "HLR" corresponding to the acronym for the expression "Home Location Register".

11. A contactless electronic label according to claim 7, wherein the information identifying the smart card corresponds, wholly or partially, to information contained in a file in a memory of said smart card.

12. A contactless electronic label according to claim 11, wherein the file in the memory of the smart card is a file known by the acronym "EF-ICC" for the expression "Entry File—Integrated Circuit Chip".

13. A contactless electronic label for a telephone handset that is adapted to be electrically connected to a smart card to constitute a mobile telephone apparatus, wherein the label is associated with the telephone handset, and has associated therewith means for recording and reading information identifying the telephone handset that comprises the serial number identifying said handset.

14. A contactless electronic label according to claim 13, wherein the information identifying the telephone handset corresponds, wholly or partially, to information contained in a file in a memory of said telephone handset.

15. An electronic smart card adapted to be associated with a mobile telephone handset, said smart card having an associated contactless electronic label having associated therewith means for recording and reading information identifying said smart card and information relating to different distribution steps through which said smart card passes.

16. The electronic smart card of claim 15, wherein the information relating to the different distribution steps comprises codes identifying the different participants at each distribution step.

17. The electronic smart card of claim 16, wherein the information relating to the different distribution steps comprises, in addition, codes identifying the status of transfers between the different participants.

18. The electronic smart card of claim 16, wherein the information relating to the different steps of distribution of the smart card comprises, in addition, the serial number of the telephone handset with which the smart card is associated.

19. The electronic smart card of claim 15, wherein the information relating to the different distribution steps comprises a call number of the subscriber, known by the acronym "MS-ISDN" for the expression "Mobile Station—Integrated Services Digital Number".

20. A mobile telephone handset adapted to be associated with an electronic smart card, said handset having an associated contactless electronic label having associated therewith means for recording and reading information identifying said handset and information relating to different distribution steps through which said handset passes.

21. The mobile telephone handset of claim 20, wherein the information identifying the telephone handset corresponds, wholly or partially, to information contained in a file in a memory of said telephone handset.

22. The mobile telephone handset of claim 20, wherein the information relating to the different distribution steps comprises codes identifying the different participants at each distribution step.

23. The mobile telephone handset of claim 22, wherein the information relating to the different steps of distribution of the telephone handset comprises, in addition, information identifying the smart card with which the telephone handset is associated.

24. The mobile telephone handset of claim 20, wherein the information relating to the different distribution steps comprises a call number of the subscriber, known by the acronym "MS-ISDN" for the expression "Mobile Station—Integrated Services Digital Number".

25. Packaging for a mobile telephone apparatus, including a contactless electronic label having means for recording and reading information identifying at least one of a telephone handset and a smart card that constitute components of said mobile telephone apparatus and information relating to different distribution steps through which said telephone handset and/or smart card passes.

26. A mobile telephone handset adapted to be associated with an electronic smart card, said handset also being associated with a contactless electronic label having means for recording and reading information identifying said handset, wherein the information identifying the telephone handset comprises the serial number identifying said handset.

* * * * *